United States Patent Office 3,580,885
Patented May 25, 1971

3,580,885
ANTIOZONANTS
Elmer A. Fike, Nitro, W. Va., assignor to
Security Chemicals, Inc., Nitro, W. Va.
No Drawing. Filed Sept. 27, 1968, Ser. No. 763,381
Int. Cl. C08c 11/40, 11/54; C08d 9/00
U.S. Cl. 260—45.8
11 Claims

ABSTRACT OF THE DISCLOSURE

The invention relates to novel N-substituted dimethyl pyrroles for use as antiozonants in rubber.

This invention relates to the prevention of the degradation of rubber and more specifically to compounds and procedures which may be used with rubber to prevent degradation thereof due to ozone and oxygen.

The physical characteristics of both natural rubbers and synthetic diene rubbers are known to be adversely affected by various agents such as oxygen and ozone. There has been a need in the rubber industry for compounds which prevent the degradation of rubber upon exposure to oxygen and ozone, while at the same time preventing any discoloration of the rubber.

Today, compounds most widely used to prevent degradation of the rubber are the aromatic amino compounds. However, these compounds have the disadvantage of causing the rubber to turn very dark in a short period of time. Furthermore, the compounds will stain anything that is in contact with the rubber, e.g., a refrigerator next to a rubber gasket or a white rim of a wheel adjacent to a black tire.

An examle of antiozonants widely used today are the heptyl or other substituted phenylene diamines. However, problems of discoloration are encountered. Another compound widely used is 6-ethoxy-2,2,4-trimethyl-1,2-dihydroquinoline, but it has the disadvantage of seriously staining materials in contact with the rubber.

Examples of antioxidants used today in rubber are the quinolines having higher alkyl substituents, phenylene groups, etc. Another antioxidant is the product of the reaction of acetone and diphenylamine. All of these agents are serious staining materials although their antioxidant properties are good. There are available certain antioxidants, which while having fair antioxidant properties, will have only slight staining properties. These are generally the reaction products between substituted phenols and sulfur dichloride which form the thiobis compounds such as 4,4'-thiobis-(6-tert-butyl-m-cresol) or reaction products of substituted cresols and either formaldehyde, acetaldehyde or butyraldehyde to give a methylene bridge between the two phenol groups. These materials are typified by 4-4'-butylidene-bis(6 - tert - butyl - m - cresol). Also, some of the hindered phenols show some promise as antioxidants such as, 6-tert-butyl-o-cresol. However, while these things do show good properties as antioxidants, they are poor antiozonants and they still cause some discoloration. It has also been found that some materials such as linseed oil, when used with the heptyl p-phenylene diamines, show some synergistic activity so far as antiozonant activity is concerned.

Accordingly, it is an object of this invention to provide compositions to be used in rubber which are effective as antiozonants and antioxidants while at the same time having limited discoloring properties. It is a further object of this invention to provide compositions which may be incorporated in rubber which will be stable over a period of time and which will not crack when subjected to stress in the presence of ozone. Other objects will be apparent from the following description.

According to the invention, it has been found that rubber compositions which are sensitive to oxygen or ozone can be prevented from the degrading action of oxygen or ozone, or the effects thereof can be greatly retarded if a slight amount of N-substituted dimethyl pyrroles are added thereto. These compounds correspond to the following general formula:

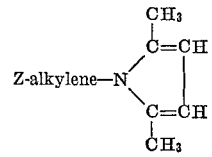

wherein Z is a substituted amino group from the following:

(a) R—NH—

(b) 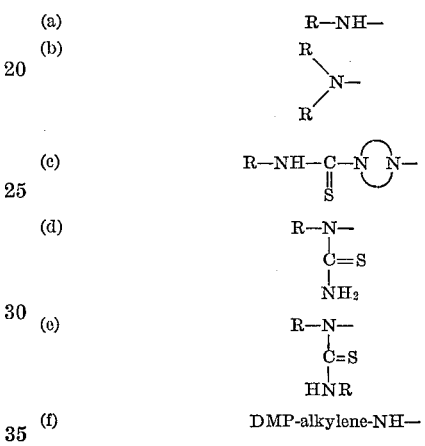

(c) $\quad$ R—NH—C—N N—
$\qquad\qquad\qquad$ ‖
$\qquad\qquad\qquad$ S (d) $\quad$ R—N—
$\qquad\quad$ |
$\qquad\quad$ C=S
$\qquad\quad$ |
$\qquad\quad$ NH$_2$ (e) $\quad$ R—N—
$\qquad\quad$ |
$\qquad\quad$ C=S
$\qquad\quad$ |
$\qquad\quad$ HNR (f) $\qquad$ DMP-alkylene-NH— in which R is alkyl containing 1–18 carbon atoms.

Among the many examples coming within the scope of the invention and useful for the purpose are the following wherein DMP is dimethyl pyrrole:

(1) $\quad$ DMP—(CH$_2$)$_3$—NH—(CH$_2$)$_3$—DMP
(2) $\quad$ (C$_2$H$_5$)$_2$—N—(CH$_2$)$_3$—DMP
(3) $\quad$ (CH$_3$)$_2$—N—(CH$_2$)$_2$—DMP
(4) $\quad$ C$_{12}$H$_{25}$—NH—(CH$_2$)$_3$—DMP
(5) $\quad$ CH$_3$—NH—(CH$_2$)$_3$—DMP
(6) $\quad$ C$_2$H$_5$—NH—(CH$_2$)$_3$—DMP
(7) $\quad$ C$_7$H$_{15}$—CH—NH—(CH$_2$)$_3$—DMP
$\qquad\qquad\;\;$ |
$\qquad\qquad\;\;$ CH$_3$ (8) $\quad$ C$_{11}$H$_{23}$—CH—NH—(CH$_2$)$_2$—DMP
$\qquad\qquad\;\;\,$ |
$\qquad\qquad\;\;\,$ CH$_3$ (9) $\quad$ C$_{15}$H$_{31}$—CH—NH—(CH$_2$)$_3$—DMP
$\qquad\qquad\;\;\,$ |
$\qquad\qquad\;\;\,$ CH$_3$

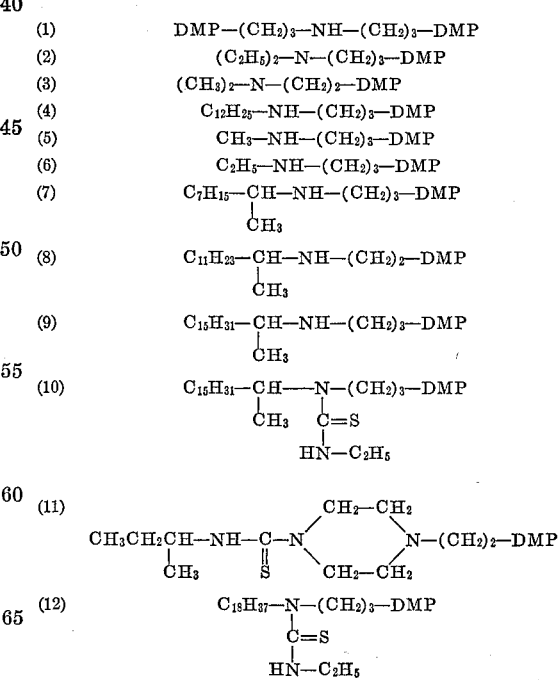

In the above formula the alkylene group may be ethylene, propylene or butylene, may be a straight or branched chain and may contain hydroxy substituents. The alkyl groups R may be branched or straight chains.

In general, the above compounds may be prepared by refluxing a solution of an amino compound, e.g., a primary or beta amine and a carbonyl compound in a suitable solvent, such as ethanol, methanol, or water.

Specifically, as an example,

DMP—(CH₂)₃—NH(CH₂)₃—DMP was prepared by charging 2 moles (262 grams) of imino bis propylamine into a flask with an agitator, feeding through a funnel into the flask 4.4 moles (500 grams) of 2,5-hexanedione at 90°–100° C., and thereafter the contents heated to reflux to remove water. After about four hours 142 cc. of water were removed. The product was distilled under vacuum and after a first cut of 21 grams, the main fraction of product consisted of 475 grams which distilled at a vapor temperature of 250° to 254° C. at a pressure of 20 mm. The 475 grams represented an 83% yield and had a crystallization point of 45° C.

In the table below are given data showing the effectiveness of certain of the compounds in preventing degradation of rubber vulcanizates. The compounds are identified from the above listing by number and Compound A is a commercially available antioxidant which is a substituted phenylene diamine. The control is a test strip containing no additive.

The test procedure involved preparing a 5% solution of the compound to be tested in xylene. Rubber strips (2" x 2" of commercial GRS stock ⅛" thick) were immersed one-half into the solution for thirty seconds and then allowed to dry. The rubber strips were bent to give stress and exposed to ozone of approximately 50 parts per 100 million for eight hours. The condition of the strip was determined by visual observation and given a 1 to 6 rating for both ozone attack and color change, with a one for best rating and a six for the poorest rating in each case.

TABLE I

| Compound: | Black stock, 8 hrs. (Ozone) | White stock, 8 hrs. (Ozone) | Color |
|---|---|---|---|
| (1) | 2 | 1 | 4 |
| (2) | 2 | 1 | 4 |
| (3) | 3 | 1 | 2 |
| (4) | 2 | 1 | 5 |
| (5) | 1 | 1 | 6 |
| (6) | 1 | 1 | 6 |
| (7) | 2 | 5 | 5 |
| (8) | 3 | 4 | 3 |
| (9) | 3 | 4 | 3 |
| (10) | 3 | 4 | 3 |
| (11) | 3 | 1 | 2 |
| (12) | 4 | 2 | 4 |
| (13) | 1 | 3 | 3 |
| Control | 6 | 6 | 1 |
| A | 3 | 1 | 6 |

The above tests establish the effectiveness of the compounds to give ozone protection and prevent degradation.

The compounds of the invention are suitable for use with natural rubber as well as the various synthetic diene rubbers.

Generally, the amount of antiozonant to be incorporated with the rubber may vary from about 0.1% to about 5%, although either smaller or greater amounts may be found useful.

The compounds of the invention are incorporated into the rubber composition by milling or mastication, and prepared for incorporation into dispersions or solutions either in powder, paste or solution form, or applied in such forms for incorporation by diffusion to the surfaces of vulcanized or unvulcanized rubber products.

What is claimed is:

1. A composition comprising a major proportion of a material selected from the class consisting of natural and synthetic diene rubbers, and from about 0.1% to about 5% of an antiozonant compound having the general formula

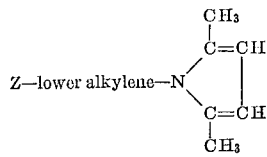

wherein Z is a substituted amino group selected from the class consisting of:

(a)     R—NH—

(b) $\left[ \begin{array}{c} R \\ R \end{array} \!\!\! >\!\! N- \right]$ (b)     R—NH—C—N   N—
                           ‖
                           S (c)     R—N—
            |
            C=S
            |
            NH₂

(d)     R—N—
            |
            C=S
            |
            HNR (e)     Dimethyl pyrrole [DMP]—lower alkylene—NH— in which R is alkyl containing 1–18 carbon atoms.

2. The composition of claim 1, wherein the antiozonant is

Dimethyl pyrrole-(CH₂)₃—NH—(CH₂)₃-dimethyl pyrrole

3. The composition of claim 1, wherein the antiozonant is

C₁₂H₂₅—NH—(CH₂)₃-dimethyl pyrrole

4. The composition of claim 1, wherein the antiozonant is

CH₃—NH—(CH₂)₃-dimethyl pyrrole

5. The composition of claim 1, wherein the antiozonant is

C₂H₅—NH—(CH₂)₃-dimethyl pyrrole

6. The composition of claim 1, wherein the antiozonant is

C₇H₁₅—CH—NH—(CH₂)₃-dimethyl pyrrole
          |
          CH₃

7. The composition of claim 1, wherein the antiozonant is

C₁₁H₂₃—CH—NH—(CH₂)₂-dimethyl pyrrole
           |
           CH₃

8. The composition of claim 1, wherein the antiozonant is

C₁₅H₃₁—CH—NH—(CH₂)₃-dimethyl pyrrole
           |
           CH₃

9. The composition of claim 1, wherein the antiozonant is

C₁₅H₃₁—CH—N—(CH₂)₃-dimethyl pyrrole
           |      |
           CH₃  C=S
                    |
                 HN—C₂H₅

10. The composition of claim 1, wherein the antiozonant is
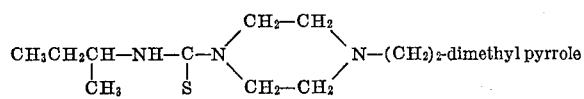
11. The composition of claim 1, wherein the antiozonant is
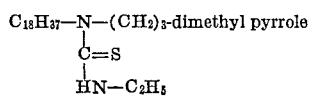
References Cited
UNITED STATES PATENTS
| | | | |
|---|---|---|---|
| 2,276,932 | 3/1942 | Coleman | 260—800 |
| 2,282,941 | 5/1942 | Coleman | 260—800 |
| 2,306,779 | 12/1942 | Coleman | 260—800 |
| 2,324,056 | 7/1943 | Barton | 260—800 |
| 2,489,000 | 11/1949 | Valentine, Jr. | 260—45.9 |
| 2,766,219 | 10/1956 | Beaver et al. | 260—45.9 |
DONALD E. CZAJA, Primary Examiner
R. A. WHITE, Assistant Examiner
U.S. Cl. X.R.
260—800